United States Patent
Jang et al.

(10) Patent No.: US 9,374,008 B2
(45) Date of Patent: Jun. 21, 2016

(54) SWITCHING MODE POWER SUPPLY WITH VARIABLE SWITCHING OPERATION FREQUENCY AND THE DRIVING METHOD THEREOF

(75) Inventors: Kyung-Oun Jang, Bucheon (KR); Gyoung-Soo Park, Seoul (KR); Hyeong-Seok Baek, Bucheon (KR); Se-Hwan Kim, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 1534 days.

(21) Appl. No.: 12/544,893

(22) Filed: Aug. 20, 2009

(65) Prior Publication Data
US 2010/0053999 A1    Mar. 4, 2010

(30) Foreign Application Priority Data
Sep. 2, 2008 (KR) .................. 10-2008-0086472

(51) Int. Cl.
*H02M 3/335* (2006.01)
*H02M 1/08* (2006.01)
*H02M 3/156* (2006.01)

(52) U.S. Cl.
CPC ............ *H02M 3/33507* (2013.01); *H02M 1/08* (2013.01); *H02M 3/156* (2013.01)

(58) Field of Classification Search
CPC .. H02M 3/33507; H02M 3/156; H02M 3/335
USPC ........... 363/49, 21.12, 21.15–21.17; 323/284, 323/288, 285, 901
See application file for complete search history.

(56) References Cited

U.S. PATENT DOCUMENTS

| | | | |
|---|---|---|---|
| 6,249,876 B1 | 6/2001 | Balakrishnan et al. | |
| 6,255,857 B1 * | 7/2001 | Iliasevitch | 326/130 |
| 6,972,971 B2 * | 12/2005 | Jang et al. | 363/49 |
| 7,203,079 B2 * | 4/2007 | Yang et al. | 363/41 |
| 7,289,582 B2 | 10/2007 | Jang et al. | |
| 7,358,821 B2 | 4/2008 | Chia | |
| 7,542,308 B2 * | 6/2009 | Yamada | H02M 1/36 323/301 |
| 2002/0039049 A1 * | 4/2002 | Minegishi | 330/252 |
| 2003/0231012 A1 * | 12/2003 | Corva et al. | 323/285 |
| 2005/0157522 A1 * | 7/2005 | Osaka | 363/21.02 |
| 2005/0259455 A1 * | 11/2005 | Mori | H02M 3/33507 363/123 |
| 2006/0196757 A1 * | 9/2006 | Choi | 200/50.38 |
| 2006/0220631 A1 * | 10/2006 | Ito | H02M 1/32 323/283 |
| 2006/0239040 A1 * | 10/2006 | Fukumoto | H02M 3/33507 363/21.01 |

(Continued)

FOREIGN PATENT DOCUMENTS

KR    10-20040037584 A    7/2004
KR       10-0632094 B1    4/2006

OTHER PUBLICATIONS

Merriam-Webster Online Dictionary, http://www.merriam-webster.com/dictionary/adjacent.*

(Continued)

*Primary Examiner* — Fred E Finch, III
*Assistant Examiner* — Gustavo Rosario Benitez
(74) *Attorney, Agent, or Firm* — Okamoto & Benedicto LLP

(57) ABSTRACT

The present invention relates to a switching mode power supply and a driving method thereof. In the present invention, a supply voltage is generated by using a start voltage that corresponds to input power, and a switching operation frequency of a power switch is changed according to an increase/decrease of the supply voltage.

20 Claims, 7 Drawing Sheets

(56) References Cited

U.S. PATENT DOCUMENTS

| | | | |
|---|---|---|---|
| 2007/0108947 A1* | 5/2007 | Liao | 323/222 |
| 2007/0253228 A1* | 11/2007 | Morota et al. | 363/21.12 |
| 2008/0049465 A1* | 2/2008 | Parto et al. | 363/49 |
| 2008/0309608 A1* | 12/2008 | Shen et al. | 345/101 |
| 2008/0310194 A1* | 12/2008 | Huang et al. | 363/21.18 |
| 2009/0072807 A1* | 3/2009 | Qiu et al. | 323/285 |
| 2009/0279333 A1* | 11/2009 | Zhu | H02M 3/33507 363/124 |
| 2010/0027299 A1* | 2/2010 | Fang | 363/21.15 |

OTHER PUBLICATIONS

IEEE, STD 100-2000, 2000, Digital Object Identifier: 10.1109/IEEESTD.2000.322234, p. 177.*

* cited by examiner

SWITCHING MODE POWER SUPPLY WITH VARIABLE SWITCHING OPERATION FREQUENCY AND THE DRIVING METHOD THEREOF

CROSS-REFERENCE TO RELATED APPLICATION

This application claims priority to and the benefit of Korean Patent Application No. 10-2008-0086472 filed in the Korean Intellectual Property Office on Sep. 2, 2008, the entire contents of which are incorporated herein by reference.

BACKGROUND OF THE INVENTION (a) Field of the Invention

The present invention relates to a switching mode power supply (SMPS) and a driving method thereof.

(b) Description of the Related Art

A switching mode power supply (SMPS) is a device that rectifies an input AC-link voltage to an input DC-link voltage and converts the input DC-link voltage to a DC-link output voltage of a different level. In this case, the DC output voltage is greater or less than the input DC voltage. Such an SMPS is used in most battery powered electronic devices, and particularly in mobile phones and laptop computers.

Switching noise generated during a switching operation of the SMPS causes electromagnetic interference (EMI) between electronic devices that include the SMPS and receive power therefrom. The switching noise includes noise components generated by harmonic components of a switching operation frequency of a switch of the SMPS. When the EMI is generated, operations of peripheral electronic devices are disturbed. In order to prevent generation of the EMI, an external device such as a filter is additionally provided to the SMPS for blocking the EMI. Accordingly, production cost is increased.

Another method to block the EMI is to change a switching operation frequency of a switch that controls operation of the SMPS. Hereinafter, the switch will be referred to as a power switch. For a control circuit of a conventional SMPS, a passive element or a digital circuit is used for changing the switching operation frequency. Furthermore, the passive element or the digital circuit is formed inside the control circuit of the SMPS so that a user of the SMPS cannot control a degree of frequency change.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switching mode power supply (SMPS) that can change a switching operation frequency of a power switch with a simple structure, and a driving method thereof.

An SMPS according to an exemplary embodiment of the present invention generates output power by converting input power, and includes a power switch and a controller that generates a supply voltage by using a start voltage corresponding to the input power and changes a switching operation frequency of the power switch according to an increase/decrease of the supply voltage. The controller generates a ramp signal and a clock signal of which frequencies are changed according to the increase/decrease of the supply voltage, controls turn-on/off of the power switch by using the ramp signal and a feedback signal corresponding to output power, and determines turn-on of the power switch by using the clock signal. The controller generates a frequency staggering signal by amplifying a difference between a voltage corresponding to the supply voltage and a predetermined first reference voltage, and changes the frequencies of the ramp signal and the clock signal according to the frequency staggering signal. The controller level-shifts the supply voltage and generates the frequency staggering signal according to a difference between the first reference voltage and the level-shifted supply voltage. The controller includes a frequency staggering signal generator that generates the frequency staggering signal, and the frequency staggering signal generator includes a level shifter and an error amplifier. The level shifter receives the supply voltage, and has a plurality of serially connected diodes and a bias current source connected to the plurality of diodes. The error amplifier amplifies a difference between a voltage of a cathode of a diode that is adjacent to the bias current source among the plurality of diodes and the first reference voltage. The controller further includes an oscillator that generates the ramp signal and the clock signal, and the oscillator generates the clock signal according to a result of comparison between the ramp signal, the frequency staggering signal, and a second reference voltage that is lower than the frequency staggering signal, and increases or decreases the ramp signal according to the clock signal. The oscillator includes an oscillator capacitor. A voltage of the oscillator is the ramp signal and the oscillator decreases the clock signal when the ramp signal is increased to the frequency staggering signal, discharges the oscillator capacitor according to the decreased clock signal, increases the clock signal when the ramp signal is decreased to the second reference voltage, and charges the oscillator capacitor according to the increased clock signal. The oscillator further includes a first current source having a first end connected to a first end of the oscillator capacitor, a charging and discharging switch having a first end connected to the first end of the oscillator capacitor, a second current source having a first end connected to a second end of the charging and discharging switch, a charging and discharging switch having a first end connected to the first end of the first current source and a second end connected to the first end of the second current source, a first comparator having a non-inversion terminal connected to the first end of the oscillator capacitor and an inversion terminal to which the frequency staggering signal is input, a second comparator having a non-inversion terminal to which the second reference voltage is input and an inversion terminal connected to the first end of the oscillator capacitor, and an SR flip-flop having a reset terminal connected to an output terminal of the first comparator and a set terminal connected to an output terminal of the second comparator, and switching the charging and discharging switch by using an output signal of an inversion output terminal thereof.

The SMPS further includes a capacitor for generating the supply voltage. The capacitor generates a predetermined charging current by using the start voltage and charges the capacitor by transmitting the charging current to the capacitor. The controller includes a supply voltage generator that generates the supply voltage, and the supply voltage generator includes a supply current generator that receives the start voltage, generates the charging current, and transmits the charging current to the capacitor, and a supply voltage controller that compares the supply voltage with a highest value and a lowest value in a predetermined range to control the supply voltage to be included within the predetermined range by controlling generation of the charging current. The supply current generator includes a JFET having a first end to which the start voltage is input, a first resistor having a first end connected to a second end of the JFET, a first MOSFET having a first end connected to the second end of the JFET, a second MOSFET having a first end connected to a gate electrode of the first MOSFET, a second end being grounded, turned on when the supply voltage reaches the highest value, and turned off when the supply voltage reaches the lowest value, a first BJT having a first end connected to a second end of the first resistor, and being diode-connected, a second BJT having a first end connected to a second end of the first MOSFET and a base connected to a base of the first BJT, a Zener diode connected between the first BJT and the capacitor, and a second resistor connected between the second BJT and the capacitor. The supply voltage controller includes a first comparator having a non-inversion terminal connected to the capacitor and an inversion terminal to which the highest value is input, a second comparator having an inversion terminal connected to the capacitor and a non-inversion terminal to which the lowest value is input, and an SR flip-flop having a set terminal connected to the first comparator, a reset terminal connected to the second comparator, and an output terminal connected to a gate electrode of the second MOSFET.

The controller of the SMPS is formed as a single chip, and the capacitor is formed outside the controller. The SMPS further includes a bridge diode that rectifies the input power and a smoothing capacitor that smoothes a voltage of the rectified input power. The start voltage is a voltage of the smoothing capacitor.

A driving method according to another exemplary embodiment of the present invention is provided to an SMPS that converts input power to output power according to a switching operation of a power switch. The driving method includes generating a start voltage corresponding to the input power, generating a supply voltage by using the start voltage, and changing a switching operation frequency of the power switch according to an increase/decrease of the supply voltage. The changing of the switching operation frequency of the power switch includes generating a ramp signal and a clock signal of which frequencies are changed corresponding to the increase/decrease of the supply voltage, controlling turn-on/off of the power switch by using a feedback signal corresponding to the output power and the ramp signal, and determining turn-on of the power switch by using the clock signal. The generating of the ramp signal and the clock signal includes generating a frequency staggering signal by amplifying a difference between a voltage corresponding to the supply voltage and a predetermining first reference voltage and changing the frequencies of the ramp signal and the clock signal according to the frequency staggering signal. The generating of the frequency staggering signal includes level-shifting the supply voltage and generating the frequency staggering signal according to a difference between the first reference voltage and the level-shifted supply voltage. The changing of the frequencies of the ramp signal and the clock signal includes generating the clock signal according to a result of comparison between the ramp signal, the frequency staggering signal, and a predetermined second reference voltage that is lower than the frequency staggering signal, and increasing or decreasing the ramp signal according to the clock signal. The generating of the supply voltage includes determining whether the supply voltage is included within a predetermined range, and generating a charging current by using the start voltage if the supply voltage is lower than the predetermined range.

The present invention provides an SMPS that can change a switching operation frequency of a power switch with a simple structure, and a driving method thereof.

DETAILED DESCRIPTION OF THE EMBODIMENTS

Figure 1:
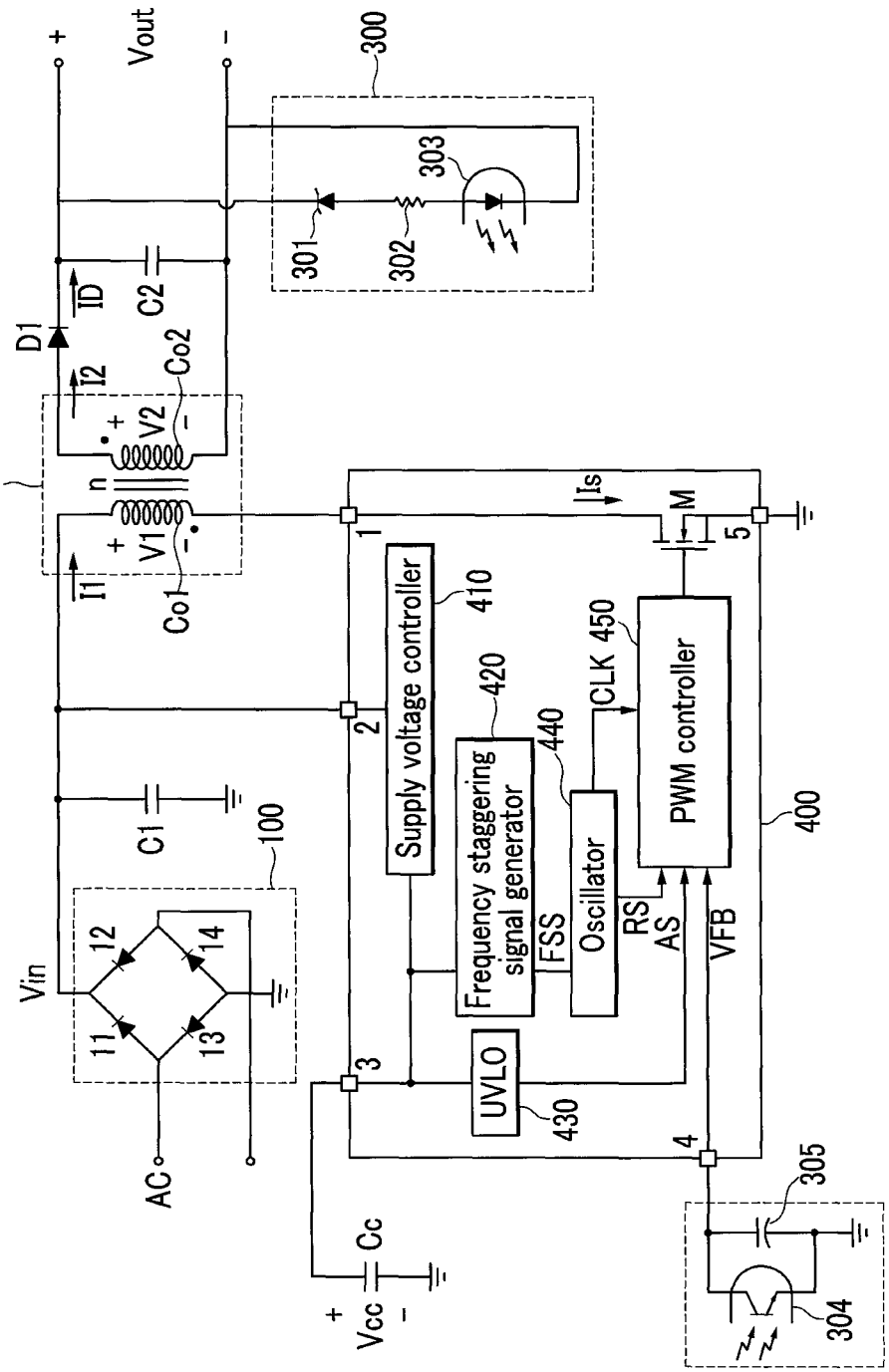
FIG. 1 shows an SMPS according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

FIG. 1 shows a switching mode power supply (SMPS) according to an exemplary embodiment of the present invention. The SMPS according to the exemplary embodiment of the present invention is realized by a fly-back converter method. However, the present invention is not limited thereto, and another converter method can be used.

As shown in FIG. 1, the SMPS according to the exemplary embodiment of the present invention includes a bridge diode 100, a transformer 200, a feedback circuit unit 300, and a controller 400.

The bridge diode 100 is formed of four diodes 11 to 14, and performs full-wave rectification on an input AC power to generate an input voltage Vin. A capacitor C1 generates a start voltage Vstr by smoothing the input voltage Vin. The start voltage Vstr is supplied to the transformer 200.

The transformer 200 includes a primary coil Co1 and a secondary coil Co2. The start voltage Vstr is supplied to a first end of the primary coil Co1 and a second end of the primary coil Co1 is connected to a drain electrode of a power switch M. A first end of the secondary coil Co2 is connected to an anode of a diode D1 and a second end thereof is connected to a first end of a capacitor C2, and a second end of the capacitor C2 and a cathode of the diode D2 are connected to each other. Voltages at both ends of the capacitor C2 become an output voltage Vout. A turn ratio n is a value obtained by dividing a winding number of the secondary coil Co2 by a winding number of the primary coil Co1. A voltage V2 is a voltage obtained by multiplying a voltage V1 by a turn ratio, and has an opposite polarity of the voltage V1.

When the power switch M is turned on, a voltage V1 at both ends of the primary coil Co1 becomes the start voltage Vstr, and a current I1 flowing to the primary coil Co1 is increased. A current IL' is increased with a slope that is proportional to the start voltage Vstr. A switch current Is is the same as the current I1 while the power switch M is turned on.

When the power switch M is turned off, the voltage V1 of the primary coil Co1 is a negative voltage that is a voltage obtained by dividing the output voltage Vout by the turn ratio n. The current I1 is decreased with a slope that is proportional to the output voltage Vout. In this case, the switch current Is is zero. When the power switch M is turned off, the voltage V1 becomes a negative voltage and the voltage V2 becomes a positive voltage. The diode D2 generates a current ID by rectifying a current flowing to the secondary coil Co2. A current ID charges the capacitor C2, or flows to a load connected to the SMPS. The capacitor C2 is charged with the current ID, and supplies a power to the load.

The feedback circuit unit 300 includes a Zener diode 301, a resistor 302, a photodiode 303, a phototransistor 304, and a capacitor 305. The feedback circuit unit 300 generates feedback information corresponding to the output voltage Vout, and controls switching operation of the power switch M so as to regulate the output voltage Vout.

A cathode of the Zener diode 301 is applied with the output voltage Vout, and an anode thereof is connected to a first end of the resistor 302. A second end of the resistor 302 is connected to a first end of the photodiode 303. When a cathode voltage is higher by a breakdown voltage than an anode voltage, the Zener diode 301 is turned on and a current flows, and a voltage difference between the cathode and the anode of the Zener diode 301 is maintained at the breakdown voltage. When the Zener diode 301 is turned on by the output voltage Vout, the current flows through the Zener diode 301, the resistor 302, and the photodiode 303. The photodiode 303 emits photons by the current flowing thereto. When the phototransistor 304 that forms a photocoupler with the photodiode 303 detects the photons, a current that corresponds to the amount of the photons flows to the phototransistor 304. As the current flowing to the phototransistor 304 is increased, charges charged in the capacitor 305 are charged and a voltage of the feedback signal VFB is decreased.

The controller 400 includes a supply voltage generator 410, a frequency staggering signal generator 420, an undervoltage lockout (UVLO) 430, an oscillator 440, and a pulse width modulation (PWM) controller 450. The controller 400 according to the exemplary embodiment of the present invention includes the power switch M, but the present invention is not limited thereto. Thus, the power switch M may be included outside the controller 400. The power switch M is an n-channel type metal-oxide semiconductor field-effect transistor (MOSFET). The main switch M includes a gate electrode as a control electrode, a drain electrode, and a source electrode. The drain electrode is connected to the first end of the primary coil Co1 of the transformer 200, and the source electrode is grounded. A gate signal VG is input to the gate electrode of the main switch M from the PWM controller 450, and the main switch M is turned on/off according to the gate signal VG. When the gate signal VG is a high level signal, the power switch M is turned on, and when the gate signal VG is a low level signal, the power switch M is turned off.

The supply voltage generator 410 generates a charging current ICH by receiving the start voltage Vstr, supplies the charging current ICH to the capacitor Cc, and controls supply of the charging current ICH to set the supply voltage Vss to be included in a predetermined range. The capacitor Cc supplies an operation current (not shown) for operation of the controller 400. In further detail, the operation current is generated from the capacitor Cc to bias operation power for each configuration of the controller 400 and elements of each configuration. That is, the capacitor Cc is charged by the charging current ICH, and is discharged by the operation current. Therefore, substantially, the supply voltage Vcc is increased according to a current obtained by subtracting the operation current from the charging current ICH, and is decreased by the operation current when the charging current ICH is not supplied to the capacitor Cc. The supply voltage Vcc according to the exemplary embodiment of the present invention varies according to charging and discharging of the capacitor Cc, and therefore increase and decrease of the supply voltage Vcc is irregularly repeated. Therefore, a waveform of the supply voltage Vcc includes a ripple, and the supply voltage Vcc has an irregular period.

The frequency staggering signal generator 420 generates a frequency staggering signal (FSS) for staggering a switching frequency of the power switch M by using the ripple of the supply voltage Vcc. Since the supply voltage Vcc is the irregular period, when a clock signal CLK that corresponds to the supply voltage Vcc is generated, the clock signal CLK also has an irregular period. In further detail, the frequency staggering signal generator 420 compares the supply voltage Vcc with a predetermined reference signal and generates a frequency staggering signal FSS that amplifies an error according to the comparison result. Then, when the supply voltage Vcc is decreased, the frequency staggering signal FSS is increased, and when the supply voltage Vcc is increased, the frequency staggering signal FSS is decreased.

The oscillator 440 receives the frequency staggering signal FSS as an input, and generates a clock signal CLK and a ramp signal according to the frequency staggering signal FSS. The clock signal CLK controls a turn-on time of the power switch M, and the ramp signal controls a turn-off time of the power switch M, together with a feedback signal. In further detail, the oscillator 440 controls the ramp signal that iteratively increases or decreases with a predetermined slope according to the frequency staggering signal FSS. The oscillator 440 increases or decreases the clock signal CLK at a time that the ramp signal reaches the frequency staggering signal FSS or a predetermined reference voltage. Since the frequency staggering signal FSS is increased or decreased according to the increase/decrease of the supply voltage Vcc, a frequency of the clock signal CLK and a frequency of the ramp signal are changed according to the supply voltage Vcc. The oscillator 440 will be described in further detail later.

When the supply voltage Vcc is less than a predetermined reference level, the UVLO 430 stops switching operation of the power switch M to prevent erroneous operation of the controller 400, and interrupts supply of the supply voltage Vcc to the controller 400. In further detail, when the supply voltage Vcc is less than the predetermined reference level, the UVLO 430 transmits a high-level abnormal signal AS to the controller 400. When the supply voltage Vcc is greater than the predetermined reference level, the UVLO 430 transmits a low-level abnormal signal AS to the controller 400.

The PWM controller 450 controls the switching operation of the power switch M by using the abnormal signal AS, the clock signal CLK, the ramp signal RS, and the feedback signal VFB. The PWM controller 450 is synchronized with the clock signal CLK and determines a switching frequency of the power switch M.

A detailed description will be provided with reference to FIG. 2 to FIG. 5.

First, referring to FIG. 2, the supply voltage generator 410 and the frequency staggering signal generator 420 according to the exemplary embodiment of the present invention will be described.

Figure 2:
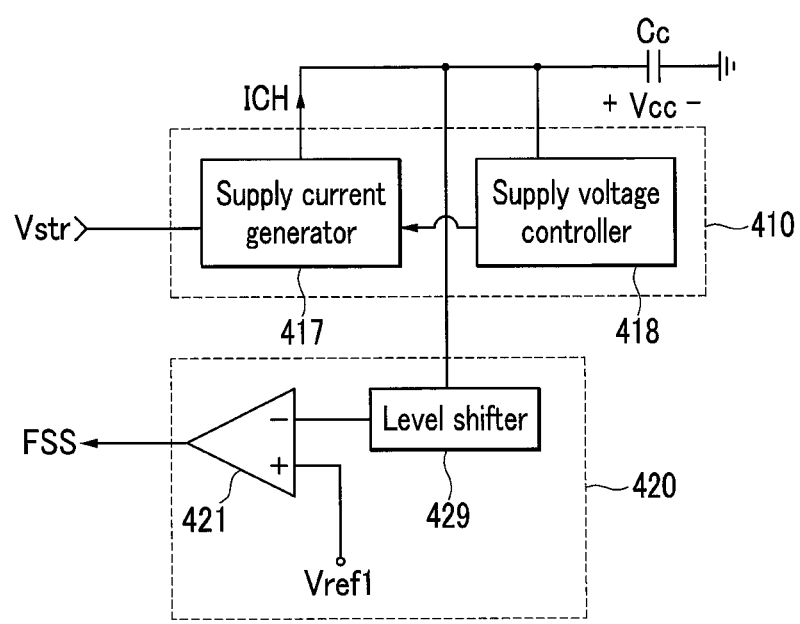
FIG. 2 shows a supply voltage generator 410 and a frequency staggering signal generator 420.

FIG. 2 shows the supply voltage generator 410 and the frequency staggering signal generator 420.

The supply voltage generator 410 includes a supply current generator 417 and a supply voltage controller 418. The supply current generator 417 generates the charging current ICH by using the start voltage Vstr to increase the supply voltage Vcc by charging the capacitor Cc. In this case, the charging current ICH is constantly maintained without regard to temperature of the controller 400.

The supply voltage controller 418 controls generation of the charging current ICH to control the supply voltage Vcc to be included within a predetermined range. The predetermined range is defined by the highest reference value VH and the lowest reference value VL. The supply voltage controller 418 compares the supply voltage Vcc with the highest reference value VH and the lowest reference value VL and controls the supply current generator 417 to prevent generation of the charging current ICH when the supply voltage Vcc is greater than the highest reference value VH. The supply voltage controller 418 controls the supply current generator 417 to generate the charging current ICH when the supply voltage Vcc is less than the lowest reference value VL.

The frequency staggering signal generator 420 includes an error amplifier 421 and a level shifter 429. The level shifter 429 decreases a level of the supply voltage Vcc and outputs the level-decreased supply voltage Vcc. The error amplifier 421 amplifies a difference between a reference voltage Vref1 and the output signal of the level shifter 429 and generates the frequency staggering signal FSS. The level decrease of the supply voltage Vcc and the reference voltage Vref1 may vary according to design conditions.

Figure 3:
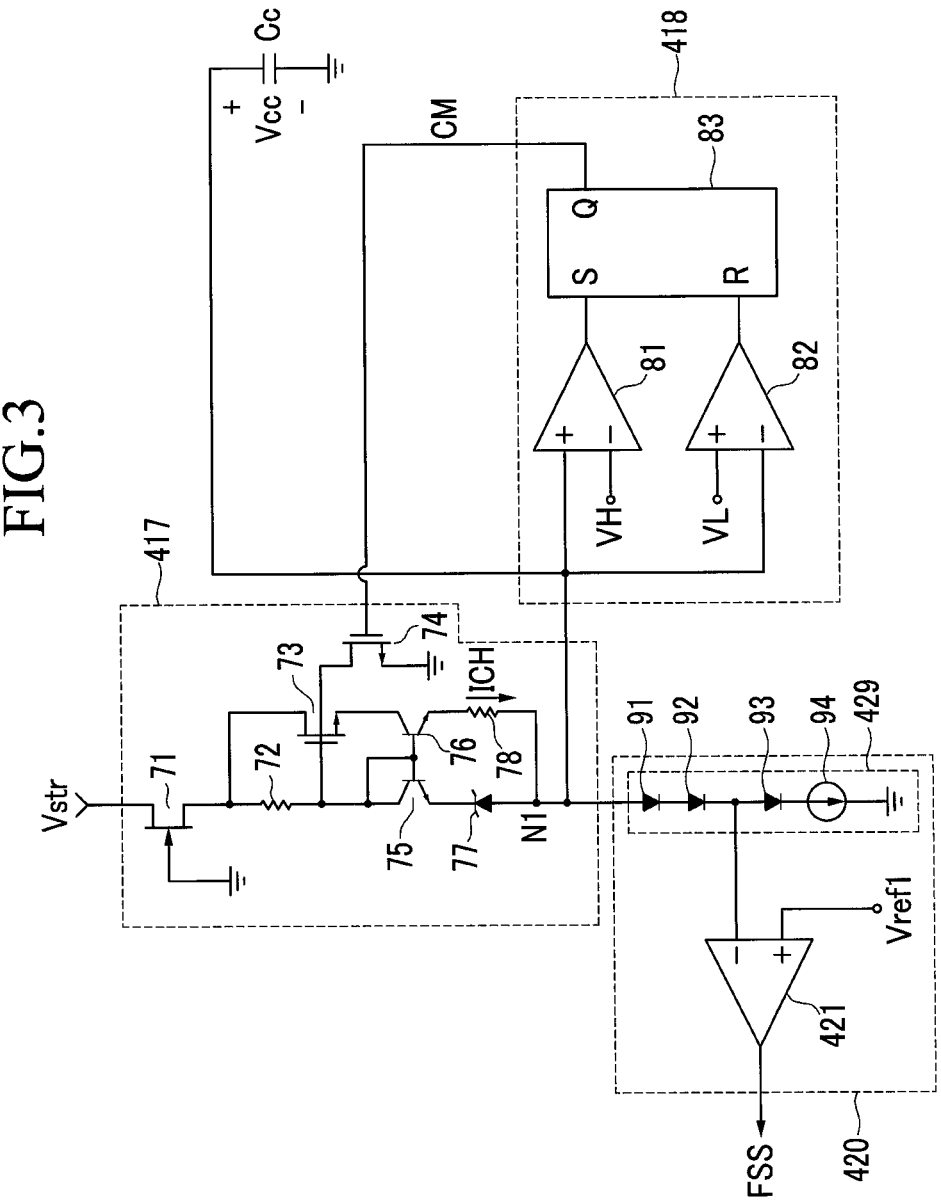
FIG. 3 shows a supply current generator 417, a supply power controller 418, and a level shifter 429 according to the exemplary embodiment of the present invention in detail.

FIG. 3 shows the supply current generator 417, the supply voltage controller 418, and the level shifter 429 according to the exemplary embodiment of the present invention in detail.

The supply current generator 417 includes a JFET 71, resistors 72 and 78, MOSFETs 73 and 74, and BJTs 75 and 76. A gate electrode of the JFET 71 is grounded, a drain electrode thereof is supplied with the start voltage Vstr, and a source electrode thereof is connected to a first end of the resistor 72 and a drain electrode of the MOSFET 73. A second end of the resistor 72 is connected to a collector of the BJT 75 and a gate electrode of the MOSFET 73. A source electrode of the MOSFET 73 is connected to a collector of the BJT 76, and the gate electrode of the MOSFET 73 is connected to a drain electrode of the MOSFET 74. A source electrode of the MOSFET 74 is grounded, and a gate electrode thereof is applied with an output signal of an SR flip-flop 83. A base of each of the BJT 75 and BJT 76 are connected to each other, and a collector and a base of the BJT 75 are connected to each other so that the BJT 75 is turned on. An emitter electrode of the BJT 76 is connected to a first end of the resistor 78, and an emitter electrode of the BJT 75 is connected to a cathode of a Zener diode 77. An anode of the Zener diode 77, a second end of the resistor 78, a non-inversion (+) terminal of the comparator 81, a first end of the capacitor Cc, and an anode of the diode 91 are connected to the same node N1.

Since the input voltage Vin is smoothed by the capacitor C1 so that the start voltage Vstr is generated, the start voltage Vstr is increased for a predetermined time period after the SMPS starts operation and then maintained within a constant range. A state during which the start voltage Vstr is maintained within the constant range is referred to as a normal state. The start voltage Vstr is higher than the supply voltage Vcc, and therefore a voltage that is higher than the breakdown voltage of the Zener diode 77 is applied to both ends of the Zener diode 77 and the Zener diode 77 is turned on. The Zener diode 77 is turned on when a voltage difference between a voltage of the cathode and a voltage of the anode reaches the breakdown voltage. When the Zener diode 77 is turned on, the voltage difference is maintained at the breakdown voltage without regard to a current flowing to the Zener diode 77. When the Zener diode 77 is turned on, a predetermined current flows through a path formed of the resistor 72, the BJT 75, and the Zener diode 77. A current flows to a BJT 76 that forms a current mirror circuit with the BJT 75. In this case, a voltage of the gate electrode, a voltage of the source electrode, and a voltage of the drain electrode of the MOSFET 73 are determined by the current flowing to the BJT 76. In further detail, a voltage of the node N1 is the supply voltage Vcc, and therefore a voltage of an emitter of the BJT 75 is maintained with a voltage that is obtained by adding the supply voltage Vcc and the breakdown voltage of the Zener diode 77. A voltage at a base of the BJT 75 is determined by the current flowing to the BJT 75, and a base voltage of the BJT 76 is the same as a base voltage of the BJT 75.

An emitter voltage of the BJT 76 becomes the same as the emitter voltage of the BJT 75. Accordingly, a voltage difference of both ends of the resistor 78 is the same as the breakdown voltage of the Zener diode 77. The breakdown voltage of the Zener diode 77 is increased as the temperature is increased, and a value of the resistor 78 is also increased as the temperature is increased. Therefore, when an increase amount of the resistor 78 is controlled to be the same as an increase amount of the Zener diode 77, a current flowing through the resistor 78 can be maintained at a constant level without regard to the temperature.

In the exemplary embodiment of the present invention, the capacitor Cc is charged by the current flowing to the JFET 71 so that the supply voltage Vcc is generated while the MOSFET 73 is turned on. In this case, the current flowing through the resistor 72, the BJT 75, and the Zener diode 77 is relatively less than the current ICH flowing through the path that includes the MOSFET 73, the BJT 76, and the resistor 78. Therefore, substantially, the capacitor Cc is charged by the current ICH so that supply voltage Vcc is increased.

When the MOSFET 74 is turned on by a control signal CM, the ground voltage is applied to the gate electrode of the MOSFET 73 so that the MOSFET 73 is turned off. Then, the charging current ICH does not flow. In this case, the current flows to the resistor 72 not through the BJT 75 and the Zener diode 77 but through the MOSFET 74. Therefore, the charging current ICH that charges the capacitor Cc does not flow anymore, and charges charged in the capacitor Cc are consumed by the operation current so that the supply voltage Vcc is decreased.

The power supplying controller 418 includes a highest value comparator 81, a lowest value comparator 82, and an SR flip-flop 83.

A non-inversion terminal (+) of the highest value comparator 81 is applied with the supply voltage Vcc, and an inversion terminal (−) is applied with the maximum value VH. The highest value comparator 81 outputs a high-level signal when the supply voltage Vcc is higher than the highest value VH and outputs a low-level voltage when the supply voltage Vcc is lower than the maximum value VH. An inversion terminal (−) of the lowest value comparator 82 is applied with the supply voltage Vcc, and a non-inversion terminal (+) thereof is applied with the lowest value VL. The lowest value comparator 82 outputs a high-level signal when the supply voltage Vcc is lower than the lowest value VL and outputs a low-level signal when the supply voltage Vcc is higher than the lowest value VL. An output terminal of the highest value comparator 81 is connected to a set terminal S of the SR flip-flop 83, and an output terminal of the lowest value comparator 82 is connected to a reset terminal R of the SR flip-flop 83. When a high-level signal is input to the set terminal S of the SR flip-flop 83, the SR flip-flop 83 generates a high-level charging control signal CM. When a high-level signal is input to the reset terminal R of the SR flip-flop 83, the SR flip-flop 83 generates a low-level charging control signal CM.

When the supply voltage Vcc reaches the highest reference value VH, the high-level signal is input to the set terminal S of the SR flip-flop 83 so that the high-level charging signal CM is generated. The charging control signal CM is applied to the gate electrode of the MOSFET 74 so that the MOSFET 74 is turned on. When the supply voltage Vcc is decreased to the lowest reference value VL, the high-level signal is input to the reset terminal R of the SR flip-flop 83 so that the low-level charging control signal CM is generated. Then, the MOSFET 74 is turned off.

Figure 4:
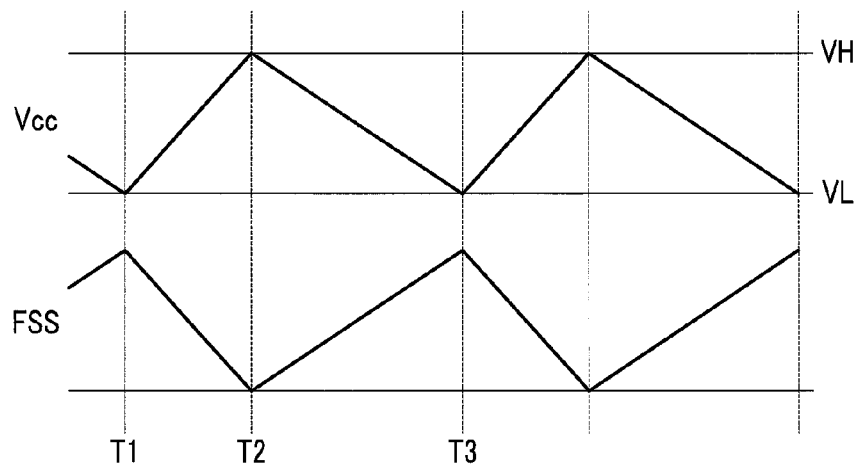
FIG. 4 shows a supply voltage Vcc and a frequency switching signal (FSS) according to the exemplary embodiment of the present invention.

The level shifter 429 includes three diodes 91, 92, and 93, and a bias current source 94. Each of the three diodes 91, 92, and 93 includes an anode and a cathode. The supply voltage Vcc is applied to the anode of the diode 91, the cathode of the diode 91 is connected to the anode of the diode 92, and the cathode of the diode 92 is connected to the anode of the diode 93 and the error amplifier 421. The cathode of the diode 93 is connected to the bias current source 94. When a current of the bias current source 94 flows to the diodes 91, 92, and 93, each of the three diodes 91, 92, and 93 generates a voltage at both ends thereof corresponding to the current. A voltage that is obtained by subtracting the voltage applied to the diode 91 from the supply voltage Vcc is applied to the anode of the diode 92, and a voltage obtained by subtracting the voltages applied to both ends of the diodes 91 and 92 from the supply voltage Vcc is applied to the cathode of the diode 92. The level shifter 429 decreases the level of the supply voltage Vcc and transmits the level-decreased supply voltage Vcc to the inversion terminal of the error amplifier 421. In the exemplary embodiment of the present invention, the supply voltage is decreased as much as the voltages applied to two diodes among three diodes connected in series, but the present invention is not limited thereto. The number of the serially connected diodes and the decrease amount of the supply voltage Vcc may be appropriately set according to the reference voltage Vref1 and a gain of the error amplifier 421. In further detail, the inversion terminal of the error amplifier 421 may be connected to the anode of the diode 93. Then, the level of the supply voltage Vcc is decreased by the amount of voltage at both ends of the diode 93. FIG. 4 shows the supply voltage Vcc and the frequency staggering signal FSS according to the exemplary embodiment of the present invention.

From a time T1, the supply voltage Vcc is increased according to a current obtained by subtracting the operation current from the charging current ICH. When the supply voltage Vcc reaches the highest value VH at a time T2, the SR flip-flop 83 outputs a high-level charging control signal CM. Then, the MOSFET 73 is turned off so that the charging current ICH is not generated. From the time T2, the capacitor Cc is discharged by the operation current so that the supply voltage Vcc is decreased.

When the supply voltage Vcc reaches the lowest value VL at a time T3, the SR flip-flop 83 outputs a low-level signal and the MOSFET 73 is turned on so that the charging current ICH is generated again. Then, the supply voltage Vcc is increased from the time T3. Through repetition of the above-described operation, the supply voltage Vcc is included within a range that is defined by the highest value and the lowest value, and has a voltage waveform characteristic with a ripple.

The frequency staggering signal FSS is a signal of amplification of an error between a level-reduced supply voltage Vcc by the level shifter and the reference voltage Vref1. Therefore, the frequency staggering signal FSS is decreased during a period in which the supply voltage Vcc is increased (e.g., during T1 to T2), and is increased during a period in which the supply voltage Vcc is decreased (e.g., during T2 to T3).

Figure 5:
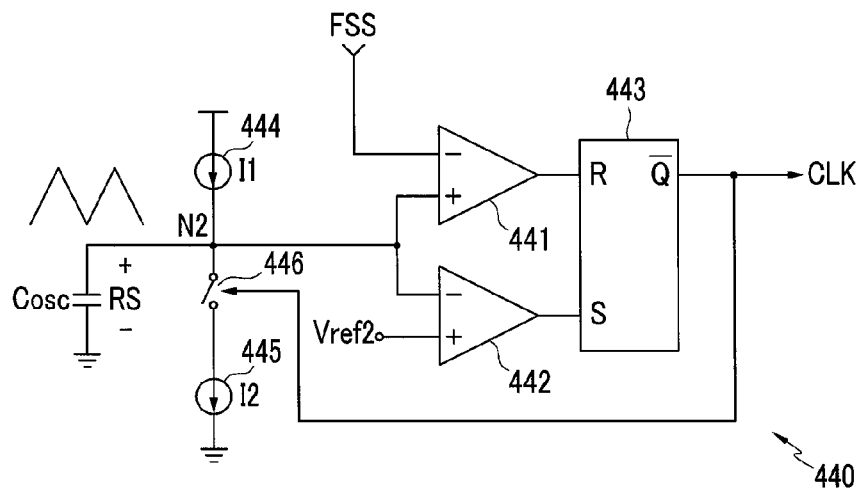
FIG. 5 shows an oscillator 440 according to the exemplary embodiment of the present invention.

FIG. 5 shows the oscillator 440 according to the exemplary embodiment of the present invention.

The oscillator 440 receives the frequency staggering signal FSS and generates a clock signal CLK and a ramp signal RS. The oscillator 440 determines rising edge timing and falling edge timing of the clock signal CLK by using the frequency staggering signal FSS and the ramp signal RS, and determines a rising period and a falling period of the ramp signal RS by using the clock signal CLK.

The oscillator 440 includes comparators 441 and 442, an SR flip-flop 443, a charging current source 444, a discharging current source 445, a charging and discharging switch 446, and an oscillator capacitor Cosc. The comparator 441 generates a signal for determining the rising edge timing of the clock signal CLK, and the comparator 442 generates a signal for determining the falling edge timing of the clock signal CLK. The frequency staggering signal FSS is input to an inversion terminal (−) of the comparator 441, and the ramp signal RS is input to a non-inversion terminal (+) of the comparator 441 and an inversion terminal (−) of the comparator 442. A reference voltage Vref2 is input to a non-inversion terminal (+) of the comparator 442, and the reference voltage Vref2 determines the lowest value of the ramp signal RS. Output signals of the comparators 441 and 442 are respectively input to a reset terminal R and a set terminal S of the SR flip-flop 443. A first end of the oscillator capacitor Cosc is connected to the charging current source 444, a first end of the charging and discharging switch 446, the non-inversion terminal (+) of the comparator 441, and the inversion terminal (−) of the comparator 442. A second end of the charging and discharging switch 446 is connected to the discharging current source 445. A second end of the oscillator capacitor Cosc is grounded, and a voltage at both ends of the oscillator capacitor Cosc becomes a voltage of the ramp signal RS. The SR flip-flop 443 logically operates signals input to the set terminal S and the reset terminal R, and inverts the logic operation result and outputs the inverted result to an inversion output terminal /Q. The SR flip-flop 443 outputs a low-level signal through the inversion output terminal /Q when the input signal of the set terminal S is high level, and outputs a high-level signal through the inversion output terminal /Q when the input signal of the reset terminal R is high level. The SR flip-flop 443 maintains a current output state when the input signals of the set terminal S and the reset terminal R are low level. A signal output through the inversion terminal /Q of the SR flip-flop 443 is the clock signal CLK. The charging and discharging switch 446 performs a switching operation according to the clock signal CLK. In further detail, when the clock signal CLK is high level, the charging and discharging switch 446 is turned on, and when the clock signal CLK is low level, the charging and discharging switch 446 is turned off. A current I2 of the discharging current source 445 is greater than a current I1 of the charging current source 444. The current I2 of the discharging current source 445 according to the exemplary embodiment of the present invention may be a multiple of a natural number W of the current I1 of the charging current source 444. The natural number W is a value for determining a decrease slope of the ramp signal, and the decrease slope of the ramp signal RS is increased as the value of the natural number W is increased. When the charging and discharging switch 446 is turned on, the oscillator capacitor Cosc is discharged by a current that is obtained by subtracting the current I1 from the current I2.

Hereinafter, operation of the oscillator 440 will be described in further detail with reference to FIG. 6.

Figure 6:
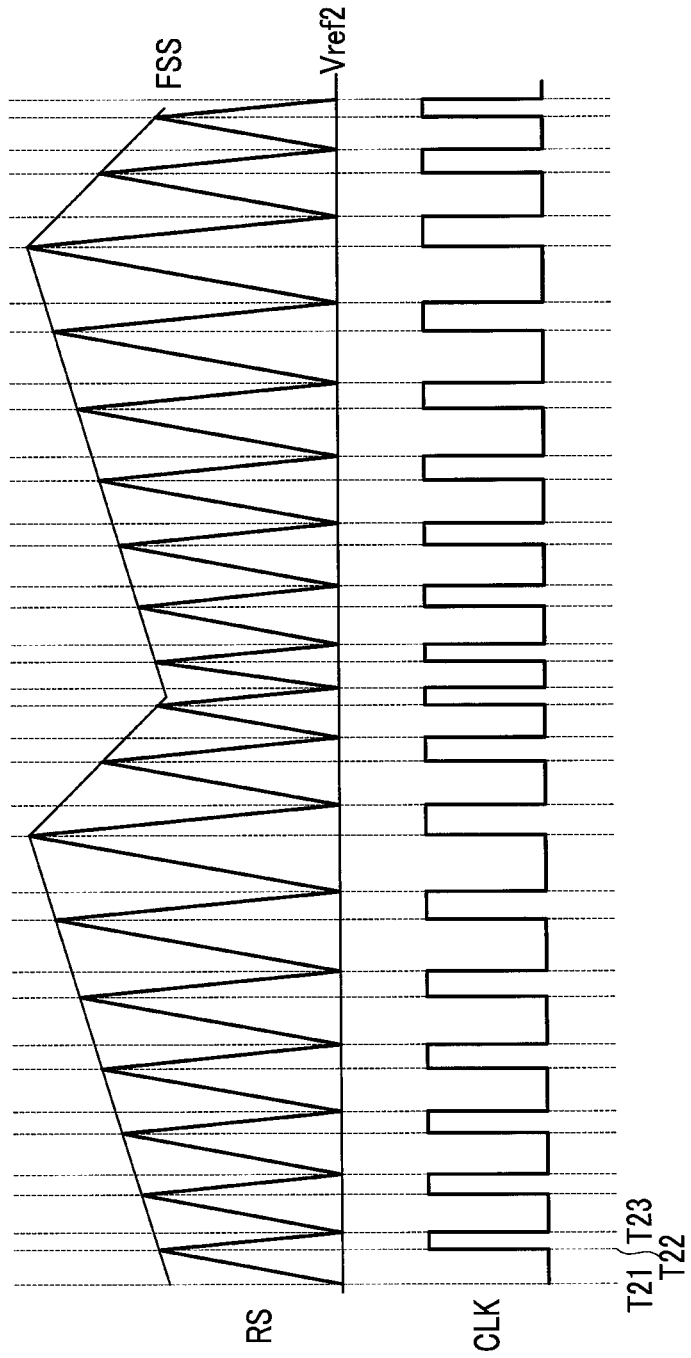
FIG. 6 shows operation of the oscillator 440.

FIG. 6 shows the frequency staggering signal FSS, the ramp signal RS, and the clock signal CLK according to the exemplary embodiment of the present invention.

When the charging and discharging switch 446 is turned on at a time T21, the ramp signal RS starts to increase by the current I1. When the ramp signal RS reaches the frequency staggering signal FSS at a time T22, the comparator 441 outputs a high-level signal. Then, the SR flip-flop 443 generates a high-level clock signal CLK. The charging and discharging switch 446 is turned on by the high-level clock signal CLK.

After the time T22, the capacitor Cosc is discharged by the current (I2−I1) so that the ramp signal RS is decreased. When the ramp signal RS reaches the reference voltage Vref2 at a time T23, the comparator 442 outputs a high-level signal. Then, the SR flip-flop 443 generates a low-level clock signal CLK. The charging and discharging switch 446 is turned off by the low-level clock signal CLK.

After the time T23, the ramp signal RS starts to increase by the current I1.

Through repetition of such operation, the ramp signal RS and the clock signal CLK are generated. When the frequency staggering signal FSS is increased, frequencies of the ramp signal RS and the clock signal CLK are decreased. When the frequency staggering signal FSS is decreased, the frequencies of the ramp signal RS and the clock signal CLK are increased. That is, when the supply voltage Vcc is increased, the frequencies of the ramp signal RS and the clock signal CLK are increased, and when the supply voltage Vcc is decreased, the frequencies of the ramp signal RS and the clock signal CLK are decreased.

Hereinafter, the PWM controller 450 according to the exemplary embodiment of the present invention will be described with reference to FIG. 7.

Figure 7:
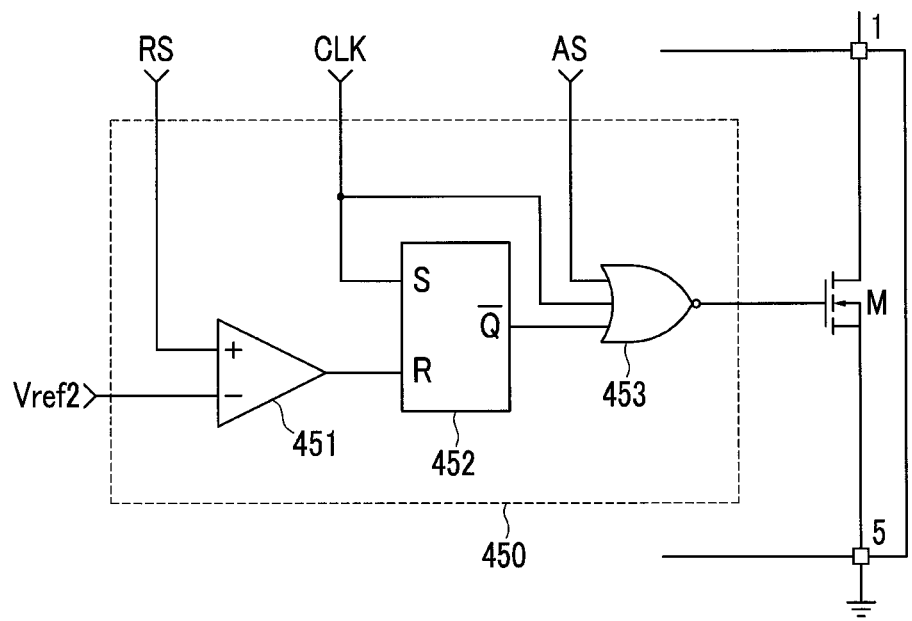
FIG. 7 shows a PWM controller 450 according to the exemplary embodiment of the present invention.

FIG. 7 shows the PWM controller 450 according to the exemplary embodiment of the present invention.

The PWM controller 450 includes a comparator 451, an SR flip-flop 452, and a NOR gate 453.

The ramp signal RS is input to a non-inversion terminal (+) of the comparator 451, and a feedback signal FB is input to an inversion terminal (−) thereof. An output terminal of the comparator 451 is connected to a reset terminal R of the SR flip-flop 452.

The clock signal CLK is input to a set terminal S of the SR flip-flop 452, and an inverted output terminal $\overline{Q}$ of the SR flip-flop 452 is connected to the NOR gate 453. When a high-level signal is input to the set terminal S of the SR flip-flop 452 the SR flip-flop 452 outputs a low-level signal, when a high-level signal is input to the reset terminal R it outputs a high-level signal, and when input signals of both of the set terminal S and the reset terminal R are low level, it maintains a current output state.

The NOR gate 453 receives the clock signal CLK, the inverted output signal of the SR flip-flop 452, and an output signal AS of the UVLO 430, performs a NOR operation on the three output signals, and generates a gate signal VG according to a result of the NOR operation. According to the NOR operation, if at least one of the input signals is high level, an output signal becomes low level, and if all the input signals are low level, the output signal becomes high level.

Figure 8:
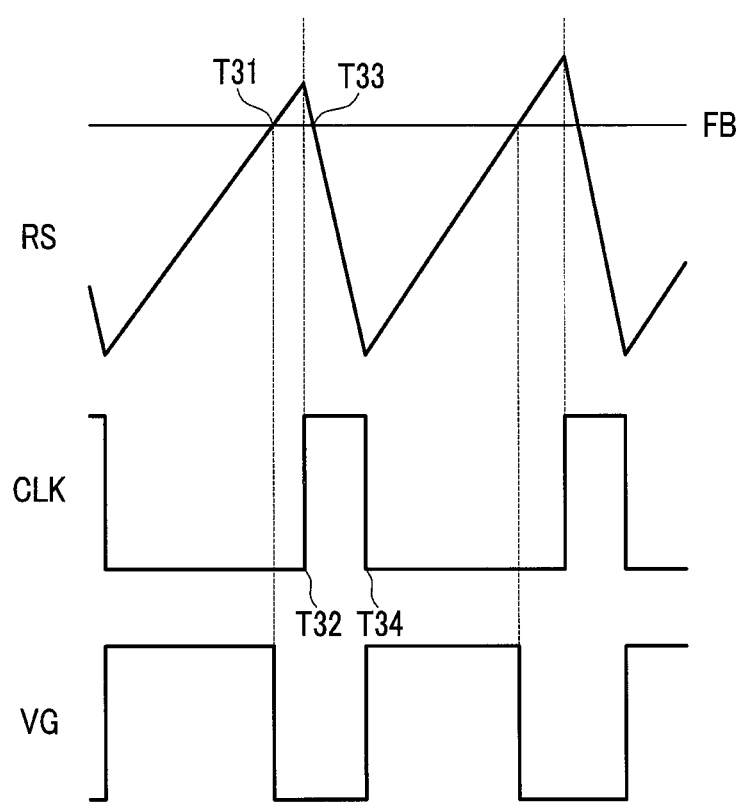
FIG. 8 shows a feedback signal (FB), a ramp signal (RS), and a clock signal (CLK) according to the exemplary embodiment of the present invention.

Referring to FIG. 8, the PWM controller 450 according to the exemplary embodiment of the present invention will be described.

FIG. 8 shows the feedback signal FB, the ramp signal RS, and the clock signal CLK according to the exemplary embodiment of the present invention.

When the ramp signal RS in the increase state reaches the feedback signal FB at a time T3, the comparator 451 outputs a high-level signal. The high-level output signal of the comparator 451 is input to the reset terminal R of the SR flip-flop 452, and the SR flip-flop 452 outputs a high-level signal. Then, the gate signal VG becomes low level.

At a time T32, the clock signal CLK is increased.

When the ramp signal RS in the decreasing state becomes lower than the feedback signal FB at a time T33, the comparator 451 outputs a low-level signal. Since the low-level output signal of the comparator 451 is input to the reset terminal R of the SR flip-flop 452 and the high-level clock signal CLK is input to the set terminal S, the SR flip-flop 452 outputs a low-level signal.

When the clock signal CLK becomes low level at a time T34, the NOR gate 453 receives low input signals, and therefore the NOR gate 453 generates a high-level gate signal VG and outputs the high-level gate signal VG.

While performing the above operation, the PWM controller 45 generates a gate signal VG and the power switch M is turned on/off according to the gate signal VG. Turn-on timing of the power switch M is determined by the clock signal CLK having an irregular period, and accordingly the switching frequency of the power switch M is staggered.

A frequency of the clock signal CLK is determined as given in Equation 1.

$$F_{CLK} = \frac{1}{Cosc(Vst - Vref2)} \times \frac{I1(I2 - I1)}{I2} \quad \text{(Equation 1)}$$

Here, $F_{CLK}$ denotes a frequency of the clock signal CLK. In Equation 1, Cosc denotes capacitance of the capacitor Cosc.

A frequency of the frequency staggering signal FSS is determined as given in Equation 2.

$$F_{Vst} = \frac{1}{Cc(VH - VL)} \times \frac{IOP(ICH - IOP)}{ICH} \quad \text{(Equation 2)}$$

Here, $F_{Vst}$ denotes a frequency of the frequency staggering signal FSS, IOP denotes an operation current, and Cc denotes capacitance of the capacitor Cc.

As shown in Equation 1, the frequency $F_{CLK}$ of the clock signal CLK is changed according to the frequency staggering signal FSS, and the frequency $F_{Vst}$ of the frequency staggering signal FSS is influenced by the capacitance of the capacitor Cc. Therefore, a range of the frequency $F_{CLK}$ of the clock signal CLK can be controlled by controlling the capacitor Cc.

In the exemplary embodiment of the present invention, the controller 400 is formed as a single chip, and the capacitor Cc is formed outside the chip. Therefore, a staggering range of the switching frequency of the power switch M can be controlled by controlling capacitance of the external capacitor Cc.

As described, the SMPS according to the exemplary embodiment of the present invention generates a clock signal CLK having an irregular frequency, and changes the switching frequency of the power switch M by using the clock signal CLK. In this case, a range of the irregular frequency of the clock signal CLK can be controlled by controlling capacitance of the capacitor Cc that generates the power supply Vcc.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switching mode power supply (SMPS) that generates output power by converting input power, comprising:
 a power switch; and
 a controller that generates a supply voltage by using a start voltage corresponding to the input power and a capacitor that supplies an operation current for the controller, the controller changes a switching operation frequency of the power switch during normal operation of the power switch according to variation of a level of the supply voltage.

2. The SMPS of claim 1, wherein the controller is configured to generate a ramp signal and a clock signal having frequencies that increase when the level of the supply voltage increases and that decrease when the level of the supply voltage decreases, to control switching of the power switch by using the ramp signal and a feedback signal corresponding to the output power, and to determine turn-on of the power switch by using the clock signal.

3. The SMPS of claim 2, wherein the controller generates a frequency staggering signal by amplifying a difference between a voltage corresponding to the supply voltage and a predetermined first reference voltage and changes the frequencies of the ramp signal and the clock signal according to the frequency staggering signal.

4. The SMPS of claim 3, wherein the controller level-shifts the supply voltage and generates the frequency staggering signal according to a difference between the first reference voltage and the level-shifted supply voltage.

5. The SMPS of claim 4, wherein the controller comprises a frequency staggering signal generator that generates the frequency staggering signal, and the frequency staggering signal generator comprises:
 a level shifter receiving the supply voltage and having a plurality of serially connected diodes and a bias current source connected to the plurality of diodes; and
an error amplifier that amplifies a difference between a voltage of a cathode of a diode that is adjacent to the bias current source among the plurality of diodes and the first reference voltage.

6. The SMPS of claim 3, wherein the controller further comprises an oscillator that generates the ramp signal and the clock signal, and the oscillator generates the clock signal according to a result of comparison between the ramp signal, the frequency staggering signal, and a second reference voltage that is lower than the frequency staggering signal, and increases or decrease the ramp signal according to the clock signal.

7. The SMPS of claim 6, wherein the oscillator comprises an oscillator capacitor, a voltage of the oscillator is the ramp signal, and the oscillator decreases the clock signal when the ramp signal is increased to the frequency staggering signal, discharges the oscillator capacitor according to the decreased clock signal, increases the clock signal when the ramp signal is decreased to the second reference voltage, and charges the oscillator capacitor according to the increased clock signal.

8. The SMPS of claim 7, wherein the oscillator further comprises:
 a first current source having a first end connected to a first end of the oscillator capacitor;
 a charging and discharging switch having a first end connected to the first end of the oscillator capacitor;
 a second current source having a first end connected to a second end of the charging and discharging switch;
 a charging and discharging switch having a first end connected to the first end of the first current source and a second end connected to the first end of the second current source;
 a first comparator having a non-inversion terminal connected to the first end of the oscillator capacitor and an inversion terminal to which the frequency staggering signal is input;
 a second comparator having a non-inversion terminal to which the second reference voltage is input and an inversion terminal connected to the first end of the oscillator capacitor; and
 an SR flip-flop having a reset terminal connected to an output terminal of the first comparator and a set terminal connected to an output terminal of the second comparator, and switching the charging and discharging switch by using an output signal of an inversion output terminal thereof.

9. The SMPS of claim 1, further comprising a capacitor for generating the supply voltage,
 wherein the controller generates a predetermined charging current by using the start voltage and charging the capacitor by transmitting the charging current to the capacitor.

10. The SMPS of claim 9, wherein the controller comprises a supply voltage generator that generates the supply voltage, wherein the supply voltage generator comprises a supply current generator that receives the start voltage, generates the charging current, and transmits the charging current to the capacitor, and a supply voltage controller that compares the supply voltage with a highest value and a lowest value in a predetermined range to control the supply voltage to be included within the predetermined range by controlling generation of the charging current.

11. The SMPS of claim 10, wherein the supply current generator comprises:
 a JFET having a first end to which the start voltage is input;
 a first resistor having a first end connected to a second end of the JFET;
 a first MOSFET having a first end connected to the second end of the JFET;
 a second MOSFET having a first end connected to a gate electrode of the first MOSFET, a second end being grounded and turned on when the supply voltage reaches the highest value, and turned off when the supply voltage reaches the lowest value;
a first BJT having a first end connected to a second end of the first resistor, and being diode-connected;
 a second BJT having a first end connected to a second end of the first MOSFET and a base connected to a base of the first BJT;
 a Zener diode connected between the first BJT and the capacitor; and
a second resistor connected between the second BJT and the capacitor.

12. The SMPS of claim 11, wherein the supply voltage controller comprises:
- a first comparator having a non-inversion terminal connected to the capacitor and an inversion terminal to which the highest value is input;
- a second comparator having an inversion terminal connected to the capacitor and a non-inversion terminal to which the lowest value is input; and
- an SR flip-flop having a set terminal connected to the first comparator, a reset terminal connected to the second comparator, and an output terminal connected to a gate electrode of the second MOSFET.

13. The SMPS of claim 9, wherein the controller is formed as a single chip and the capacitor is formed outside the controller.

14. The SMPS of claim 1, further comprising:
- a bridge diode that rectifies the input power; and
- a smoothing capacitor that smoothes a voltage of the rectified input power,
- wherein the start voltage is a voltage of the smoothing capacitor.

15. A driving method of an SMPS that converts input power to output power according to switching operation of a power switch, comprising:
- generating a start voltage corresponding to the input power;
- generating a supply voltage by using the start voltage and a capacitor that supplies operation current for controlling switching operation of the power switch; and
- changing a switching operation frequency of the power switch during normal operation of the power switch according to a variation of a level of the supply voltage.

16. The driving method of claim 15, wherein the changing of the switching operation frequency of the power switch comprises:
- generating a ramp signal and a clock signal
- increasing a frequency of the ramp signal and a frequency of the clock signal when the level of the supply voltage increases;
- decreasing the frequency of the ramp signal and the frequency of the clock signal when the level of the supply voltage decreases;
- controlling switching of the power switch using a feedback signal and the ramp signal; and
- determining turn-on of the power switch by using the clock signal.

17. The driving method of claim 16, wherein the generating of the ramp signal and the clock signal comprises:
- generating a frequency staggering signal by amplifying a difference between a voltage corresponding to the supply voltage and a predetermined first reference voltage; and
- changing the frequencies of the ramp signal and the clock signal according to the frequency staggering signal.

18. The driving method of claim 17, wherein the generating of the frequency staggering signal comprises level-shifting the supply voltage and generating the frequency staggering signal according to a difference between the first reference voltage and the level-shifted supply voltage.

19. The driving method of claim 18, wherein the changing of the frequencies of the ramp signal and the clock signal comprises generating the clock signal according to a result of comparison between the ramp signal, the frequency staggering signal, and a predetermined second reference voltage that is lower than the frequency staggering signal, and increasing or decreasing the ramp signal according to the clock signal.

20. The driving method of claim 15, wherein the generating of the supply voltage comprises:
- determining whether the supply voltage is included within a predetermined range; and
- generating a charging current by using the start voltage if the supply voltage is lower than the predetermined range.

* * * * *